July 24, 1928.
W. A. PATRICK ET AL
1,678,298
PROCESS FOR REFINING OILS AND WAXES
Filed March 16, 1922 3 Sheets-Sheet 1
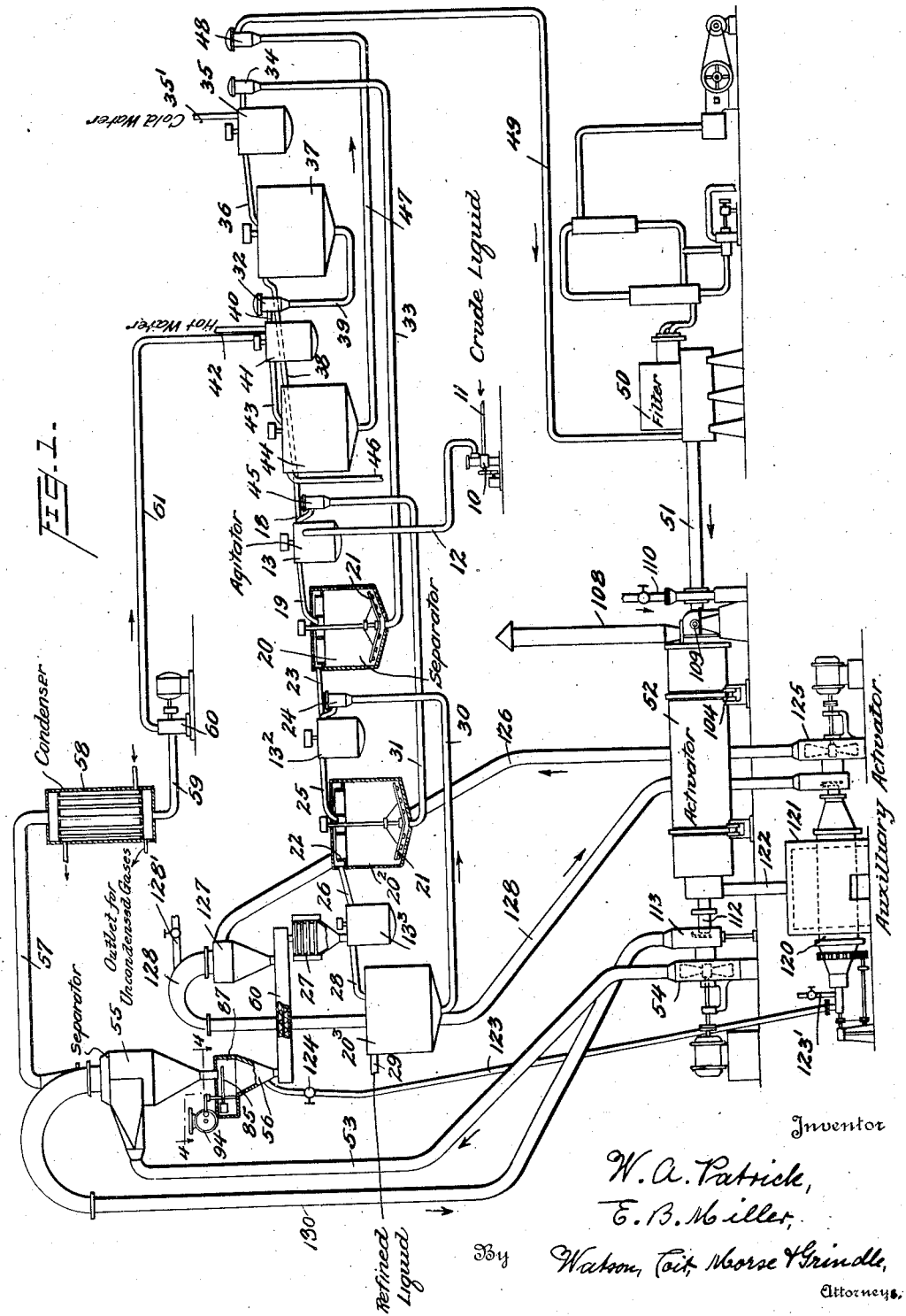
Inventor
W. A. Patrick,
E. B. Miller,
By Watson, Tait, Morse & Grindle,
Attorneys.

July 24, 1928.
W. A. PATRICK ET AL
1,678,298
PROCESS FOR REFINING OILS AND WAXES
Filed March 16, 1922      3 Sheets-Sheet 2
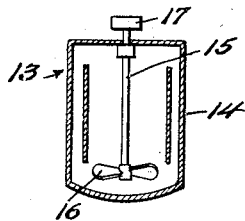
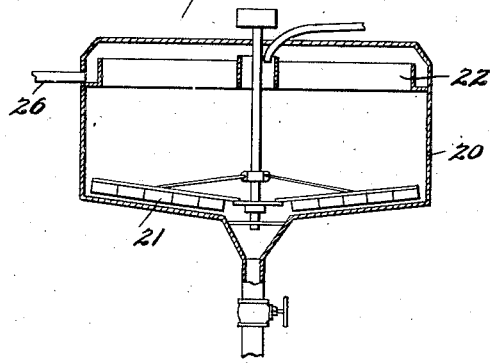
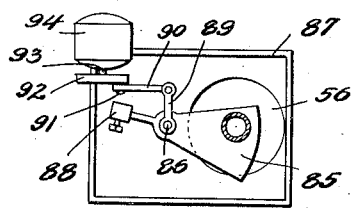

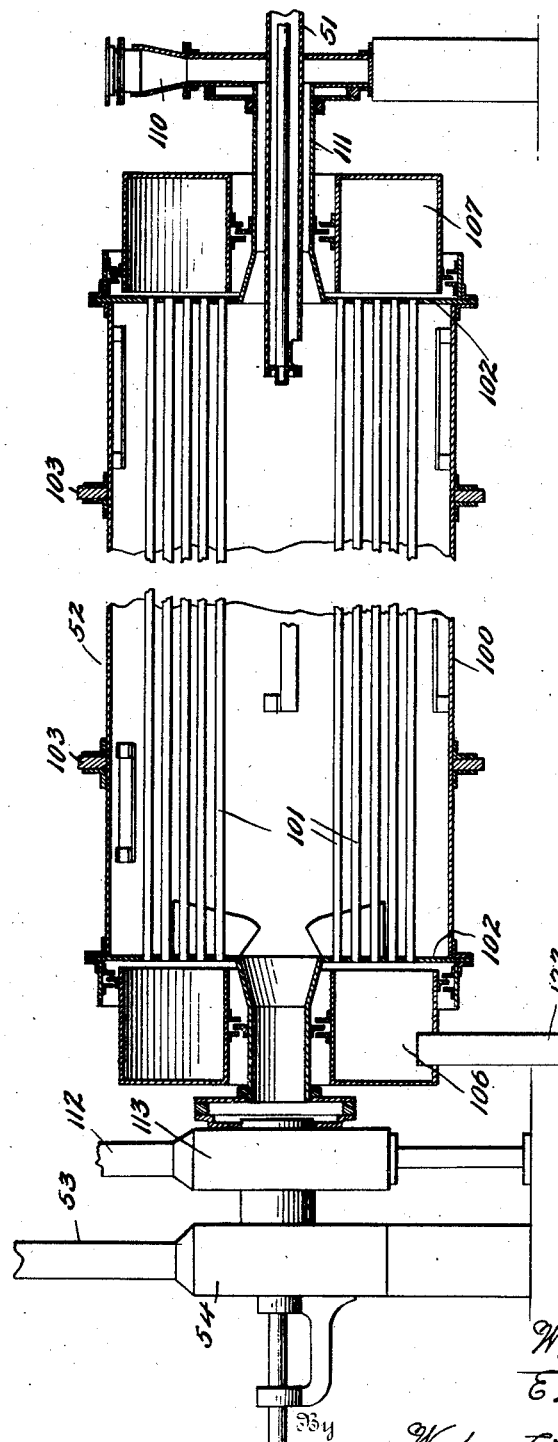

Patented July 24, 1928.

1,678,298

UNITED STATES PATENT OFFICE.

WALTER ALBERT PATRICK, OF MOUNT WASHINGTON, AND ERNEST BALDWIN MILLER, OF BALTIMORE, MARYLAND, ASSIGNORS TO THE SILICA GEL CORPORATION, OF BALTIMORE, MARYLAND, A CORPORATION OF MARYLAND.

PROCESS FOR REFINING OILS AND WAXES.

Application filed March 16, 1922. Serial No. 544,186.

The present invention relates to a process for refining oils and waxes.

A prior application Patent 1,537,260 to Patrick discloses the discovery that porous bodies having ultra-microscopic pores will adsorb certain solutes from solution under certain conditions. The present invention is in the nature of a species under the broad invention covered by said patent. According to the present invention, it has been discovered that oils can be refined by adsorbing, with porous bodies, impurities that are in solution in the oils, provided the adsorbing material has a lower surface tension toward the substance to be adsorbed than toward the oils.

Briefly stated, the present invention consists in adsorbing the impurities from the oil in the pores of an adsorbing material having ultra-microscopic pores, then liberating the substance adsorbed in the material and using the material again for refining more oil.

For purposes of illustration, the invention will be described in connection with the refining of petroleum products, such as gasoline or kerosene. It is to be distinctly understood, however, that the invention applies to waxes and oils in general, vegetable, animal and mineral, including benzine, toluene, carbon-tetrachloride and aniline.

The objects and features of novelty of the invention will be apparent from the description taken in connection with the drawings, in which:

Figure 1 is a diagrammatic view illustrating in elevation one form of apparatus for refining such liquids as petroleum products;

Figure 2 is a sectional elevation of one form of agitator that may be employed in the apparatus;

Figure 3 is a sectional elevation of one form of separator that may be used in the apparatus;

Figure 4 is a sectional plan view taken substantially on the line 4—4 of Figure 1, showing a feed device; and Figure 5 is a longitudinal sectional elevation through one form of activator that may be employed.

In said prior patent, the discovery is disclosed that a solute may be adsorbed from a solution under certain conditions by means of a porous material having very fine or ultra-microscopic pores. The pores of the adsorbing material required are so small that it is a very difficult matter to accurately determine and define their size. For this purpose, however, reference may be had to the amount of water that one gram of material will adsorb when exposed to water vapor under definite condition of temperature and partial pressure of water vapor.

A liquid that wets a capillary tube will rise in the tube above the level of the surface of the liquid surrounding the same, the extent of the rise varying with the diameter of the tube. The vapor pressure of the liquid inside the tube is smaller than the vapor pressure at the level surface of the liquid outside the tube. This lowering of the vapor pressure by the liquid within the capillary tube is not appreciable until the diameter of the tube is extremely small, and the smaller the bore of the tube, the greater the decrease in vapor pressure. The amount of water adsorbed by a porous body at a given temperature and partial pressure depends both upon the size of the pores and upon the total interior volume of the pores. By determining the amount of a given material, water for example, which may be adsorbed by each of the porous bodies under the same condition of temperature and partial pressure, we have a means of comparing the size and volume of the pores in the two adsorbents. For example, one gram of silica gel (made in accordance with Patent 1,297,724) has a total internal volume of about 0.41 cc. In other words, if we completely fill the pores in silica gel with water, the amount of water taken up will be approximately 41% of the initial weight of the gel. A sufficient percentage of the total internal volume in silica gel is made up of pores of such size that the gel will adsorb water vapor to such an extent as to contain at least 21% of its own weight of water when in equilibrium with water vapor at 30° C. and a partial pressure of substantially 22 mm. of mercury. Kieselguhr and boneblack under the above conditions will adsorb practically no water. Highly activated charcoal, such as cocoanut charcoal, will adsorb more water than the silica gel mentioned above provided it is wetted by water. It follows, therefore, that kieselguhr and boneblack have practically no pores as small as the greater part of the pores in silica gel. On the other hand, highly activated charcoal has more small pores than silica gel.

It has been found that materials which adsorb water vapor to such an extent as to contain less than 10% of their initial weight of water when in equilibrium with water vapor at 30° C. and a partial pressure of substantially 22 mm. of mercury have pores too large to be of any practical value in adsorbing solutes from solutions.

The material preferred for practicing said prior and the present method is silica gel having a structure like that obtained when the gel is made in accordance the method disclosed in the patent to Patrick 1,297,724. In cases where silica gel is not suitable, other gels or adsorbing materials may be used, provided they have a sufficient number of small pores as defined above, i. e., activated charcoal, gels of iron oxide, tin oxide, aluminum oxide, tungstic oxide, zirconium oxide, and titanium oxide.

The hard porous silica gel preferably employed as an adsorbing material in the present invention should be distinguished from the dried gelatinous precipitate obtained for example by mixing an acid and sodium silicate and then drying. This latter product, however, when dried, does not have the porous structure of the gel made in accordance with said patent or by dialysis, and is not suitable to adsorb solutes from solutions to any practical extent. According to said patent, solutions of an acid and a substance are employed of such concentrations and in such quantities that the substance will react with the acid to form a homogeneous, colloidal solution of silicic acid. Immediate coagulation of the mass is prevented by thorough stirring at the time of mixing the ingredients. Three or four hours after mixing, the substance sets without precipitation to a homogeneous, jelly-like mass and, when this is dried slowly in accordance with the method described in the patent, a hard porous gel is obtained, the pores being ultra-microscopic.

According to said prior invention that solute will be adsorbed from a solution that exhibits the smallest surface tension toward the wall of the porous material. Furthermore, the separation of a new phase from the solution is easier the smaller the solubility of the substance in the solution. As a measure of solubility, the critical solution temperature may be selected. The greatest adsorptive effect will be obtained from a solution having the highest critical solution temperature. Moreover, the extent of the adsorption is also influenced by the difference in density between the components of the solution. The smaller the difference in density, the greater will be the adsorption of one of the components from the solution.

Having set forth the principal features of said prior invention, the present invention will now be described. Although the present invention is applicable to oils in general, it will be described as applied to refining gasoline or kerosene.

Straight run and cracked gasoline and kerosene distillates in general contain sulphur compounds, have a disagreeable or "sour" odor and a yellow color. All these features vary widely with different products, depending upon the source of the crude oil, upon whether it is a straight run distillate or a product of cracking.

The exact form in which sulphur exists in gasoline or kerosene has been the subject of considerable study and the solution of the problem is still incomplete. It is well known that there are at least two forms, one which re-acts to the doctor test and one which does not. This doctor test consists in adding a solution of lead oxide and sodium hydroxide to a sample of the hydrocarbon. Certain of the sulphur compounds, if present in the sample, will re-act with the solution to color it. In all probability, ordinary unrefined gasoline and kerosene contain a varying quantity of complex organic sulphur compounds, some of which give a positive re-action to the doctor solution. They may contain also some simpler compounds of sulphur, possibly of different types, which do not re-act with the doctor solution. It is also believed that some gasolines contain dissolved elementary sulphur. It is known that dissolved sulphur may give a negative doctor test. It is further known that certain gasolines and kerosenes containing sulphur and giving a negative doctor test will, after standing, develop a positive doctor test. Such a change is accelerated by heat and light and by contact with air (oxygen) and moisture. As a result, we often find that a gasoline or kerosene, refined by chemical treatment to give a negative doctor test, will later show a positive re-action toward the doctor solution.

The same is true regarding both color and odor. Thus a gasoline, for example, may be refined by chemical treatment, such as with sulphuric acid, alkali and lead oxide, to such an extent that the product is water white or nearly so and has a "sweet" odor, but on standing this apparently satisfactory product, particularly if exposed to light, moisture and oxygen, will develop a yellow color and a "sour" odor.

It is thought that the re-appearance of a positive doctor test is due to chemical changes taking place subsequent to refining, as a result of which sulphur or sulphur compounds not removed by the process of refining employed are changed into different compounds which give a positive re-action toward the doctor solution. Such changes appear to involve certain unsaturated constituents of the gasoline as well as sulphur. These same or similar changes give rise also to a "sour" odor and result in the formation of gummy substances which remain dissolved in the gasoline, imparting a yellow color to it.

Petroleum products, such as gasoline and kerosene, refined in accordance with the present invention, although high in unsaturated constituents, remain colorless or water white indefinitely, even when exposed to air and light. These refined hydrocarbons, having more than 10% unsaturated hydrocarbons and a sulphur content below 0.02%, which remain indefinitely colorless are new products. The relative amounts of unsaturated hydrocarbons may be determined by re-action with 93% sulphuric acid as described in Bulletin No. 5, Bureau of Mines, December 29, 1920. Moreover, no known refined petroleum product having over 10% unsaturated hydrocarbons which will give a negative gum test, has been made. This test consists in evaporating to dryness 100 cc. of the sample in a polished copper dish. For a negative test there should be no discoloring of the dish nor deposit left. This test is described in Bulletin No. 5, Bureau of Standards, page 3, Corrosion Test. The product obtained by refining sufficiently in accordance with the present invention gives a negative gum test. In this respect in addition to the others, the product is new.

Briefly stated, according to the present invention, the petroleum product is refined by bringing the crude product into intimate contact with an adsorbing material having pores of a size to adsorb the matter in solution, the material preferably being in powdered condition; allowing the liquid and adsorbed material to remain in contact until the objectionable constituents are adsorbed by the material and thereafter separating the refined product from the material.

It is also desired to liberate the adsorbed impurities from the adsorbing material, such as silica gel, so that the adsorbent may be used over again. Generally, this is accomplished by driving out the substance adsorbed in the adsorbing material by immersing the material in a liquid that has a lower surface tension at an interface with the adsorbing material than the substances adsorbed, so that the latter are replaced by the liquid; and then activating the material by driving off or liberating the liquid. For the products having higher boiling points this wash is not sufficient and in addition steam activation may be employed.

For the purpose of adsorbing the impurities and matters in solution from the petroleum to be refined, any one of several methods may be used. For example, the crude liquid may be made to percolate through a tower filled with a porous adsorbing material, such as silica gel, and the refined product drawn off at the bottom of the tower. After the gel has become saturated with the impurities being removed from the liquid, the crude is diverted to a second similar tower, while the gel in the first tower is reactivated by suitable means.

In practice, however, it is preferred to use a different method. The preferred method consists in causing a stream of crude liquid to enter at one end of and to flow successively through a series of agitators and separators, containing a proper porous adsorbing material, such as silica gel, which is fed in continuously at the end opposite to that at which the liquid enters and by appropriate means made to move in the direction counter-current to the liquid flow. In this way a part of the objectionable constituents of the liquid being refined is removed at each stage, as the liquid flows through the apparatus, until finally the refining is completed in the last stage, where the liquid, which has already had most of the impurities removed, comes in contact with freshly activated adsorbing material.

Referring to the drawings, the liquid to be refined, such as a petroleum product, is supplied to a pump 10 by a pipe 11 and this pump through the pipe 12 feeds the petroleum into an agitator 13. This agitator may be of any suitable construction. As shown in Figure 2, it may consist of a closed vessel 14 having a vertical shaft 15, provided with blades 16, said shaft projecting above the top of the vessel and having a pulley 17 whereby the shaft is rotated. Suitable adsorbing material, such as silica gel previously mentioned, is supplied through the pipe 18 to the agitator so that the petroleum and gel are thoroughly mixed. The mixture is continuously discharged through the pipe 19 to a separator 20. As shown in Figure 3, this separator, the function of which is to separate the adsorbing material from the liquid, consists of a closed-top vessel having a slightly conical bottom provided with an outlet. A shaft is disposed vertically in the vessel and adjacent the bottom thereof has the deflectors 21 for forcing the adsorbing material, which settles at the bottom, toward the outlet. Around the top of the vessel may be a launder 22. The adsorbing material settles to the bottom of the tank and is discharged through the outlet, while the petroleum product flows into the launder and is carried by a pipe 23 to an agitator $13^2$ and a pump 24 acts to continuously supply adsorbing material to said agitator $13^2$. The mixture is discharged from this second agitator through a pipe 25 to a second separator 20². In the same manner as previously described, the adsorbing material settles to the bottom of this separator and the petroleum is discharged through a pipe 26 into a third agitator 13³. This agitator is supplied with freshly activated adsorbing material from a hopper 27. The mixture from the agitator is conveyed by the pipe 28 to a third separator 20³. The refined petroleum is discharged from this separator through a pipe 29. The adsorbing material which settles to the bottom of the third separator is discharged through the outlet in the bottom and conveyed by the pipe 30 to the pump 24, previously mentioned, this pump acting to cause the flow of the adsorbing material. The adsorbing material discharged at the bottom of the second or middle separator is conveyed by a pipe 31 to a pump 45 which discharges into the pipe 18 previously mentioned. This pump 45 effects the flow in the pipe 31.

Although an apparatus having three units, each unit consisting of an agitator and a separator has been described the invention is not limited to any particular number of units.

It will be noted that the fresh, or activated gel is fed into the system to act on the product being refined just before it is finally discharged and then its path through the apparatus is from the discharge end toward the inlet end. Thus, the product fed into the first agitator 13 is mixed with adsorbing material that has already passed through a plurality of separators. This counter-flow of the adsorbing material and the petroleum to be refined gives a very efficient action.

The adsorbing material settling in the bottom of the first separator 20 is discharged into a pipe 33. This adsorbing material has adsorbed impurities from the petroleum and, of course, has petroleum associated therewith. In order to make the process continuous, it is now necessary to free the adsorbing material from its adsorbed substances or "activate" it.

So far as liquids similar to gasoline, kerosene and benzol are concerned, they may be distilled out of gels without difficulty as by steam activation claimed in application 566,664, filed June 7, 1922. The objectionable substances removed by the adsorption, however, often consist of or contain complex organic compounds, usually associated with sulphur, which on heating to a sufficiently high temperature to volatilize them undergo decomposition in the gel, frequently with deposition of carbonaceous and gummy materials, difficult to remove from the gel. This difficulty is aggravated in the refining of lubricating oils, waxes, etc.

In all phenomena in connection with adsorption by solids from liquids, the surface tension at the interface between the solid and the liquid is one of the most important factors determining the degree of adsorption. Since the adsorbing materials used in the present invention always contain water the surface tension at the interface of gel and water will be zero and, therefore, less than the surface tension at the interface of the porous material and other liquids. Accordingly, such porous materials, for example gels, will adsorb water in preference to any other liquid. When a gel which has been saturated with gasoline, for example, (or other liquid immiscible with water) is brought in contact with water, the latter will be adsorbed and the gasoline driven out. If the contact is maintained long enough, the displacement of gasoline by water will become complete. Furthermore, this water displacement of adsorbed oils may be accelerated by working at a higher temperature.

According to the present invention, it has been further discovered that when a gel having adsorbed in it a mixture of hydrocarbons, such as is obtained by bringing gel in contact with kerosene, is treated with water, the lighter hydrocarbons are driven out more rapidly than the heavier fractions, particularly if the water is cold. The products associated with the gel are, therefore, recovered in fractions, which is a very desirable method inasmuch as the most objectionable constituents in unrefined gasoline, which any process of refining seeks to remove, appear to consist largely of high-boiling hydrocarbons containing sulphur. Accordingly, the lighter and more valuable fractions of the adsorbed liquid may be displaced by agitation for a limited time with cold water and the liberated substance drawn off. The heavier fractions, including most of the objectionable sulphur compounds and other impurities, are liberated by agitation, repeatedly if necessary, with hot water. The oil recovered by cold water displacement is usually of about the same quality as the original unrefined distillate and may be rerun. The very much smaller fraction recovered by hot water agitation consists of relatively high-boiling constituents running high in sulphur and unsaturated hydrocarbons, and is suitable for fuel oil. This fraction, regardless of its sulphur content, is unsuitable for burning as kerosene.

The product containing over 25% unsaturated hydrocarbons obtained from the pores of adsorbing material saturated by refining a petroleum product, is new. It is free from sulphuric acid and may run as high as 75% or more unsaturated hydrocarbons. Perhaps it may best be defined as the product obtained from the pores of a porous material having pores of a size to adsorb not less than 10% of its own weight of water at 30° C.

when exposed to water vapor at a partial pressure of substantially 22 mm. of mercury, which material has been used in refining a petroleum product. This new product is particularly adapted for use as a flotation oil in the flotation process of recovering metals, because it has such a high percentage of unsaturated hydrocarbons.

The gel, or other porous material employed, having been freed by water displacement of the hydrocarbons and other constituents adsorbed from the liquid being refined, is removed from the wash water, filtered, and the resulting gel cake, which now contains practically nothing but water, is run into an activator and its water content reduced to the desired extent, usually 6 to 8%, rendering the gel ready for re-use.

Referring now to the drawings, the saturated gel flows through the pipe 33 to a pump 34 which discharges into a water wash agitator 35 of the same construction as the other agitators. Cold water is supplied to this agitator through a pipe 35′ so that the gel is thoroughly mixed with the water for the purpose of driving out the substances adsorbed in the refining described above. This agitator discharges through a pipe 36 into a separator 37 of the same construction as the other separators, in which the gel settles to the bottom and gasoline or other petroleum products liberated from the gel are carried by the pipe 38 to the agitator 13 so that these products are again run through the refining process. The gel which settles to the bottom of the separator 37 is carried by pipe 39 to the pump 32 which discharges into another agitator 41 supplied with hot water by the pipe 42. This agitator discharges the mixture into another separator 44. The fraction recovered by this hot water agitator, consisting of relatively high-boiling constituents, is discharged through the pipe 46 and may be used for fuel oil, or as a flotation oil. The gel which settles to the bottom of the tank 44 is carried by pipe 47 to pump 48 and discharged through pipe 49 to a filter press 50 of any suitable construction. In this press the surface water is filtered out and the gel cake discharged through the pipe 51 to an activator 52. This activator is illustrated in Figure 5. Briefly stated, it comprises a cylindrical shell 100 with tubes 101 connecting the opposite heads 102. The shell is provided with circumferential rings 103 supported by rolls 104 (Figure 1) whereby the cylinder as a whole may be rotated. Hot gases are supplied through the pipe 122 which has communication with the chamber 106. This chamber in turn is in communication with the interior of the tubes 101 so that the hot gases pass through the tubes to the chamber 107 at the opposite end of the cylinder. This chamber is in communication with a suction fan 109 (Figure 1) having the outlet pipe 108. The adsorbing material to be activated is supplied through the conduit 51. If necessary, water, or steam, or other gas may be supplied to the interior of the activator through the inlet 110 which has communication with the centrally disposed tube 111 secured to the head 107. Usually, however, there is sufficient water in the adsorbing material supplied to the activator 52 so that the steam necessary for distilling all the adsorbed substances is supplied from this source. It is the aim of the arrangement to prevent ingress of air to the activator and have the adsorbed substances distilled out of the pores of the adsorbing material, for the reason that if heat as furnished by the hot gases alone is employed for activating the adsorbing material, there is danger of the deposition of carbonaceous and gummy materials within the pores of the adsorbing material. This does not occur where air is excluded from the activator. The dried adsorbing material is discharged through the duct 112 into the intake of the fan 54. The pipe 53 from the fan, discharges the gel or adsorbing material into a cyclone separator 55 wherein the gel settles to the bottom and is discharged into a hopper 56 from which it is fed by a screw conveyor 60 to the hopper 27 which discharges into agitator 13³ thereby returning the gel into the refining cycle. If desired the gel may be cooled and for this purpose the hopper 27 has its upper portion constructed with cooling surfaces. The vapor and air separated out by the cyclone separator 55 may be discharged into the atmosphere, or, if it is desired to recover any of the vapors or gases, they pass through a pipe 57 to a condenser 58. The condensate and gel not separated by the cyclone 55 is drained through a pipe 59 to a pump 60 which discharges through a pipe 61 into the water wash agitator 41.

To prevent any passage of vapors at the lower end of the cyclone separator 55, a novel form of feeding device is employed. As shown in Figure 4, this comprises a plate 85 carried by an oscillating shaft 86 disposed in a box 87, having a hopper bottom 56. The plate 85 is disposed horizontally and is counterbalanced by the weight 88. As shown in Figure 1, the plate is disposed a slight distance below the lower end of the outlet of the cyclone separator 55. The plate is oscillated back and forth in a horizontal plane in any suitable manner, but the extent of oscillation is not sufficient to open up the lower end of the cyclone at any time. For the purpose of oscillating the shaft 86 any suitable mechanism may be employed. As shown, an arm 89 is secured to the upper end of the shaft and outside the box 87. This arm is connected by a link 90 to a crank pin 91 on the crank disk 92, the latter being carried by the armature shaft 93 of the motor 94. In operation, the continual oscillation of the plate 85 effects a uniform feed of the adsorbing material into the hopper 56 but at no time permits passage of vapors.

If desired the discharge from the cyclone separator 55, in addition to being connected to the condenser 58 may have a return pipe 130 for conveying steam to a point adjacent the inlet of the fan 54, as shown at 113. In this manner the steam is used over and over again and a greater volume of gases is supplied to the fan so that the velocity in the pipe 53 is sufficient to raise the adsorbing material therewith. It is to be understood that the pipes 53 and 130 are thoroughly lagged.

In refining some liquids it may happen, after the adsorbing material has made many cycles through the apparatus, that its absorbing efficiency will be decreased because of the deposition of carbonaceous or gummy materials within its pores. Where this is liable to occur an auxiliary activator may be employed to drive off these substances from the adsorbing material.

As shown this auxiliary activator, in the form of the drum 120, is disposed in the furnace 121 which supplies hot gases through the pipe 122 to the main activator 52. Adsorbing material taken from the hopper 56 or other point may be carried through pipe 123 to the inlet end of the activator 120. This pipe may be supplied with a valve or damper 124 to control the flow of adsorbing material therein. At its discharge end the auxiliary activator 120 has a blower 125 discharging through pipe 126 into a cyclone separator 127. The adsorbing material discharged through this pipe 126 is separated from the air and gases in the cyclone separator 127 and discharged into the cycle at any suitable point, as the worm conveyor 60. The gases from the top of the cyclone 127 are returned by pipe 128 to the activator 120 at a point adjacent the inlet of the blower 125. In this manner these gases are used over and over to raise the activated adsorbing material. A small quantity of the gases may be exhausted through pipe 128', and the loss made up by air supplied through pipe 123' at the inlet end of the activator. In this manner oxygen is obtained to burn the carbonaceous deposits in the pores of the material. It will be understood that the quantity of adsorbing material supplied to this auxiliary activator may be regulated by valve 124. If desired, all of the adsorbing material from hopper 56 may be passed at intervals through the auxiliary activator 120.

It will be seen, therefore, that a method is provided in which the porous adsorbing material is used over and over in a closed cycle. Not only are the gums already present in the petroleum products removed, but also the compounds capable of forming gums, thereby obtaining a product which will permanently conform to the requirements as to doctor and gum tests, odor and color. Furthermore, the gums are removed without destroying the unsaturated hydrocarbons and the process is, therefore, particularly adapted for the refining of shale oils which may be as high as 90% unsaturated.

It is noted that with the present method the use of sulphuric acid or other chemicals is eliminated, also the losses resulting from the solvent and destructive action of sulphuric acid, particularly upon unsaturated compounds in the product being refined. The process also eliminates any troublesome by-product, such as sludge acid. The refining may be carried to any degree desired. The product may be refined to such an extent that it will have a permanently sweet odor, a permanently negative doctor test, a water white color, even after indefinite exposure to direct sun light in the presence of air and moisture, and a sulphur content as low as 0.01%.

When the present process is employed to refine heavy or viscous oils or waxes, they will be maintained in fluid condition by the application of heat in any suitable manner.

The term "petroleum" or "petroleum products" in the specification and claims are intended to include shale oils.

It is to be understood that the method constituting the present invention is not limited to the apparatus described, as the process may be carried out with other apparatus.

Having thus described the invention, what is claimed as new and desired to be secured by Letters Patent is:

1. In the process of refining oils, the step consisting in treating the oil with a solid absorbent material having pores of such size that it will adsorb water vapor to such an extent as to contain not less than about 10% of its own weight of water when in equilibrium with water vapor at 30° C. and a partial pressure of substantially 22 mm. of mercury.

2. In the process of refining oils, the step consisting in treating the oil with a hard porous adsorbent gel having pores of such size that it will adsorb water vapor to such an extent as to contain not less than about 10% of its own weight of water when in equilibrium with water vapor at 30° C. and a partial pressure of 22 mm. of mercury.

3. The process according to claim 1 wherein the adsorbing materials has pores of such size that it will adsorb water vapor to such an extent as to contain at least 21% of its own weight of water when in equilibrium with water vapor at 30° C. and a partial pressure of substantially 22 mm. of mercury.

4. In the process of refining oils, the step consisting in treating the oil with a hard porous silica gel having pores of such size that it will adsorb water vapor to such an extent as to contain not less than about 10% of its own weight of water when in equilibrium with water vapor at 30° C. and a partial pressure of 22 mm. of mercury.

5. In the process of refining oils, the step consisting in treating the oil with a solid artificial adsorbent material having pores of such size that it will adsorb water vapor to such an extent as to contain not less than about 10% of its own weight of water when in equilibrium with water vapor at 30° C. and a partial pressure of substantially 22 mm. of mercury.

6. In the process of refining oils, the step consisting in treating the oil with a solid adsorbent material having pores of such size that it will adsorb water vapor to such an extent as to contain not less than about 10% of its own weight of such adsorbed water vapor when in equilibrium with water vapor at 30° C. and a partial pressure of substantially 22 mm. of mercury.

7. In the process of refining oils, the step consisting in treating the oil with a solid, inorganic adsorbent material having pores of such size that it will adsorb water vapor to such an extent as to contain not less than abount 10% of its own weight of such adsorbed water vapor when in equilibrium with water vapor at 30° C. and a partial pressure of substantially 22 mm. of mercury.

8. In the process of refining oils, the step consisting in treating the oil with a solid inorganic, artificial adsorbent material having pores of such size that it will adsorb water vapor to such an extent as to contain not less than about 10% of its own weight of such adsorbed water vapor when in equilibrium with water vapor at 30° C. and a partial pressure of substantially 22 mm. of mercury.

9. In the process of refining oils, the step consisting in treating the oil with a solid inorganic, adsorbent material having pores of such size that it will adsorb water vapor to such an extent as to contain at least 21% of its own weight of water when in equilibrium with water vapor at 30° C. and a partial pressure of substantially 22 mm. of mercury.

10. The process of refining oils, which consists in treating the oil with a solid, inorganic adsorbent material having pores of such size that it will adsorb water vapor to such an extent as to contain not less than about 10% of its own weight of such adsorbed water vapor when in equilibrium with water vapor at 30° C. and a partial pressure of substantially 22 mm. of mercury, separating the adsorbent from the oil, activating the adsorbent and returning the same to treat more oil, the adsorbent being circulated over and over in a closed path.

11. The process of refining oils which consists in treating the oil with a hard, porous silica gel having pores of such size that it will adsorb water vapor to such an extent as to contain not less than about 10% of its own weight of water when in equilibrium with water vapor at 30° C. and a partial pressure of 22 mm. of mercury, separating the adsorbent from the oil, activating the adsorbent and returning the same to treat more oil, the adsorbent being circulated over and over in a closed path.

In testimony whereof we hereunto affix our signatures.

WALTER ALBERT PATRICK.
ERNEST BALDWIN MILLER.